Jan. 12, 1943.　　W. R. SCHMITZ, JR　　2,308,031
SEPARATION APPARATUS
Filed June 1, 1940　　6 Sheets-Sheet 1
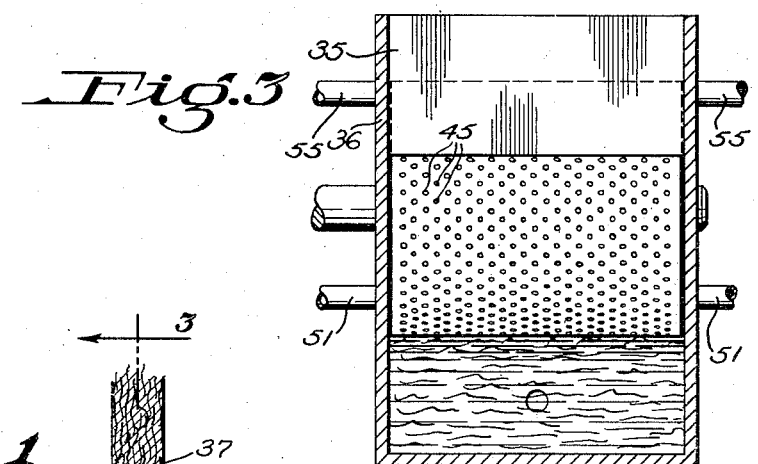
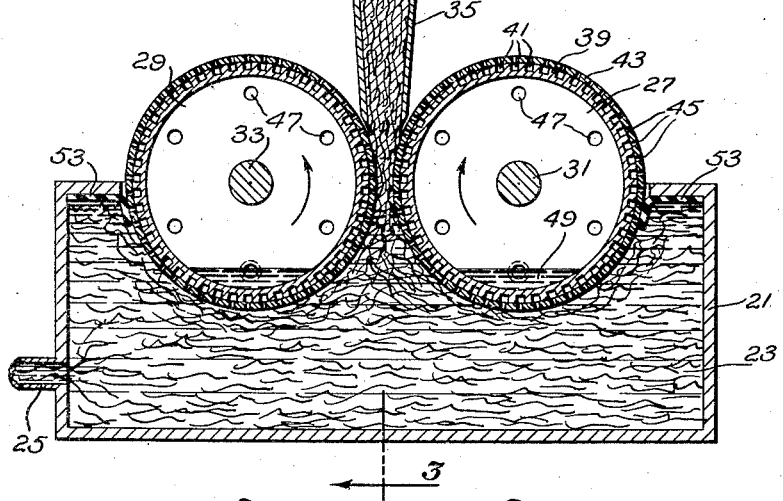
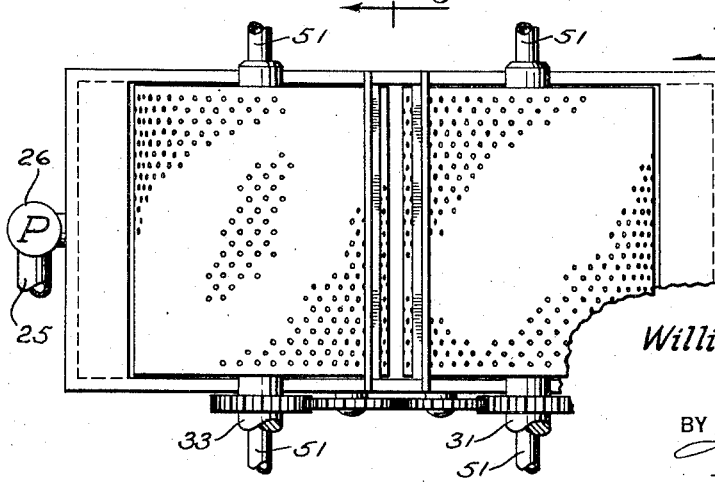
William R. Schmitz, Jr.
INVENTOR
BY
ATTORNEY Jan. 12, 1943.   W. R. SCHMITZ, JR   2,308,031
SEPARATION APPARATUS
Filed June 1, 1940   6 Sheets-Sheet 2
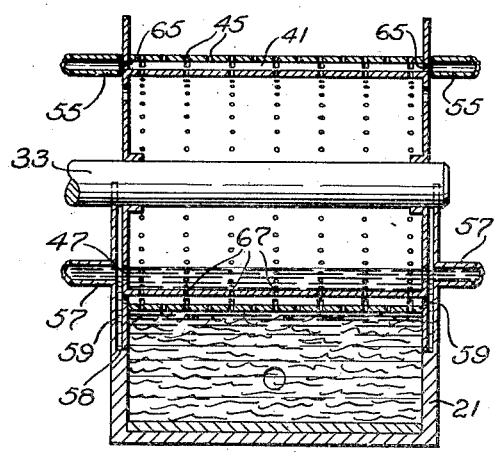
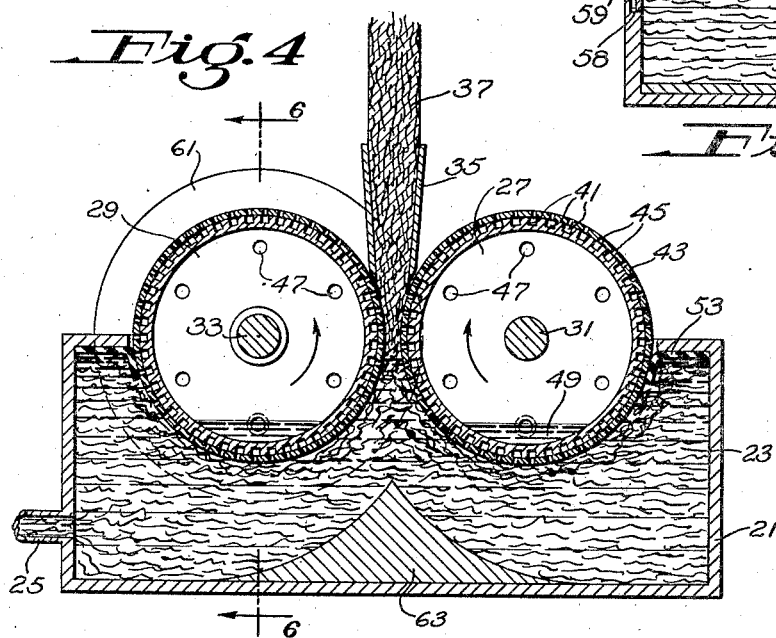
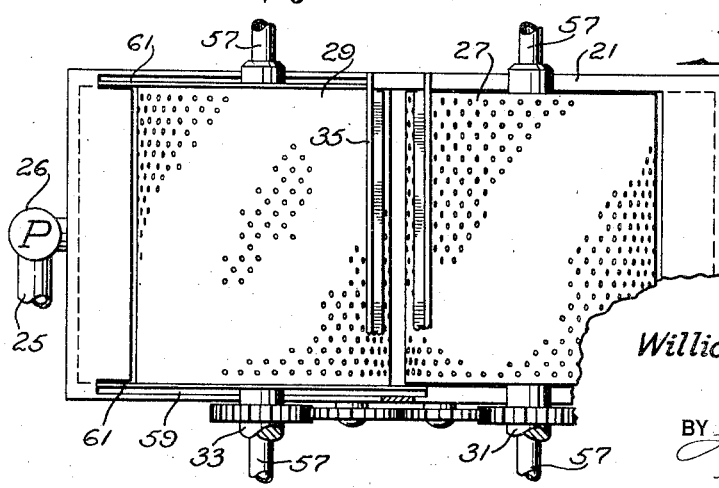
William R. Schmitz, Jr.
INVENTOR
ATTORNEY Jan. 12, 1943.  W. R. SCHMITZ, JR  2,308,031
SEPARATION APPARATUS
Filed June 1, 1940  6 Sheets-Sheet 3
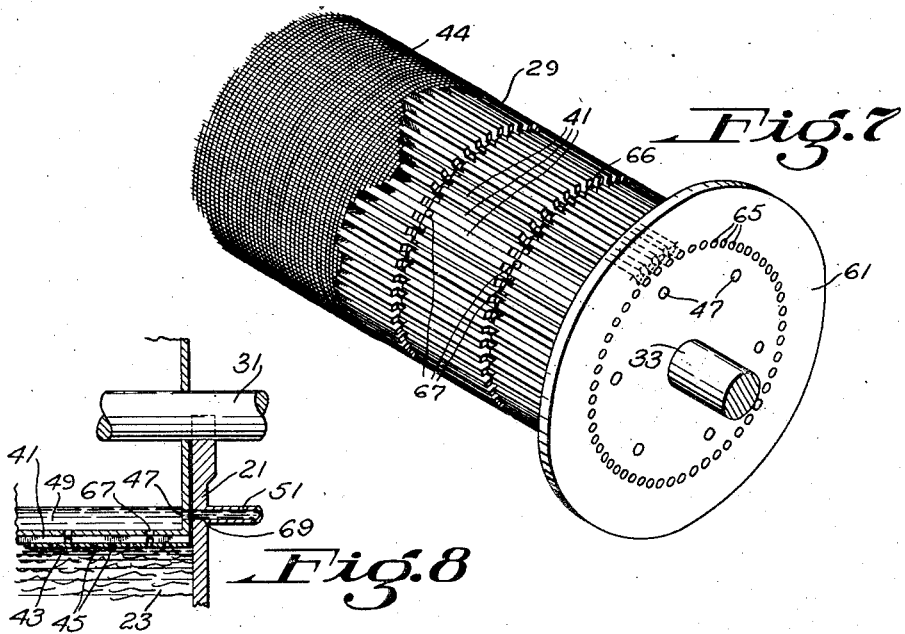
William R. Schmitz, Jr.
INVENTOR
BY
ATTORNEY Jan. 12, 1943.  W. R. SCHMITZ, JR  2,308,031
SEPARATION APPARATUS
Filed June 1, 1940  6 Sheets—Sheet 4
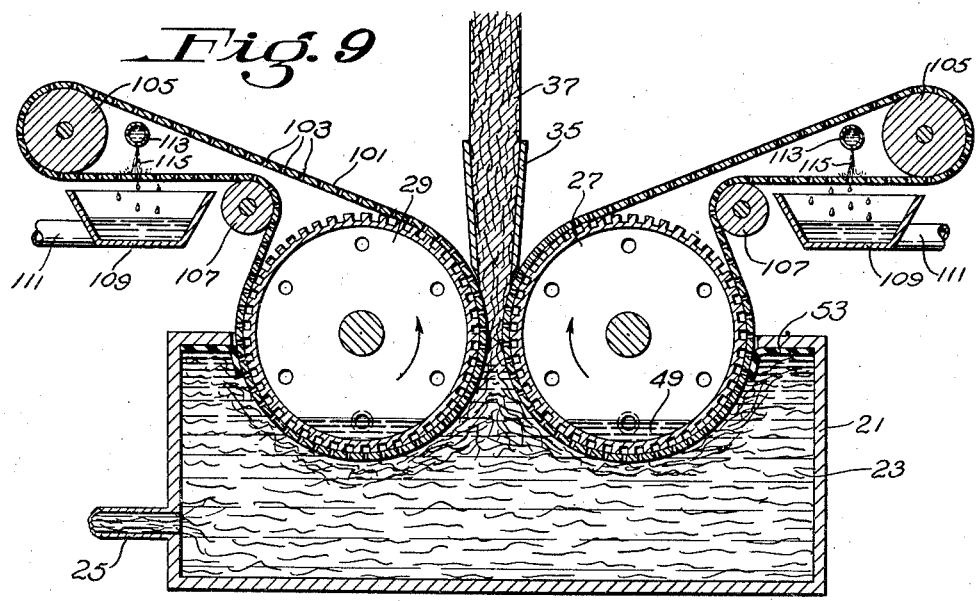
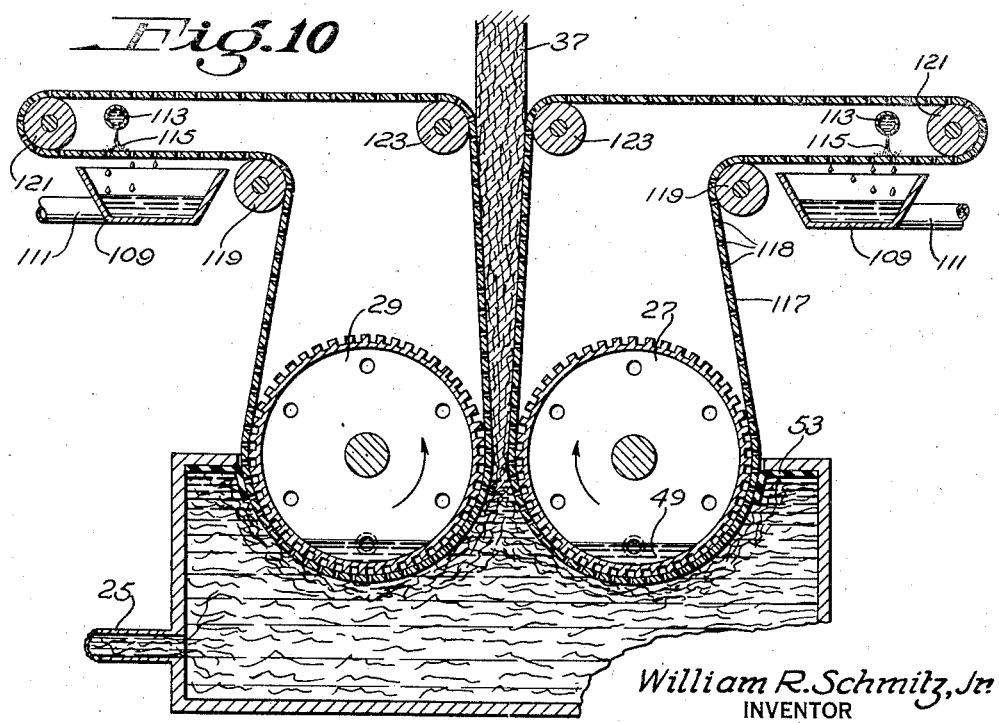
William R. Schmitz, Jr.
INVENTOR
BY
ATTORNEY Jan. 12, 1943.  W. R. SCHMITZ, JR  2,308,031
SEPARATION APPARATUS
Filed June 1, 1940  6 Sheets-Sheet 5
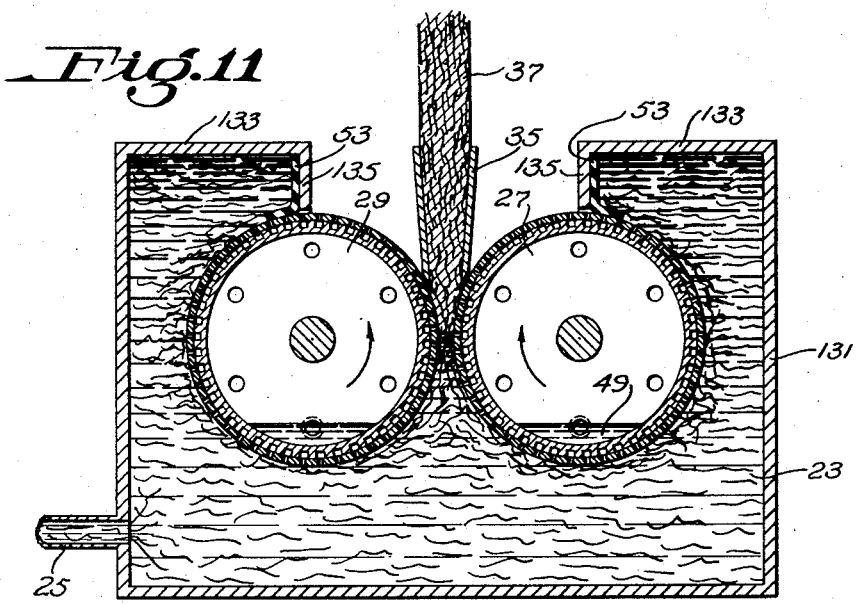
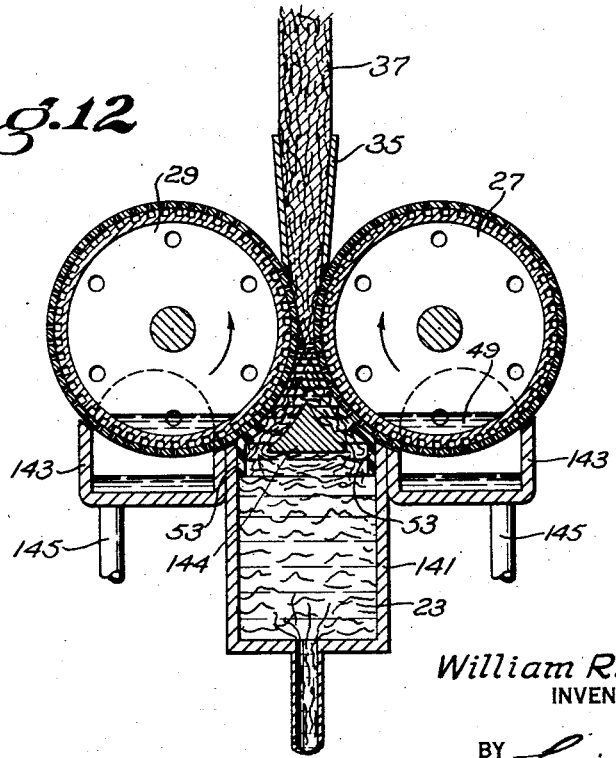
William R. Schmitz, Jr.
INVENTOR
BY
ATTORNEY

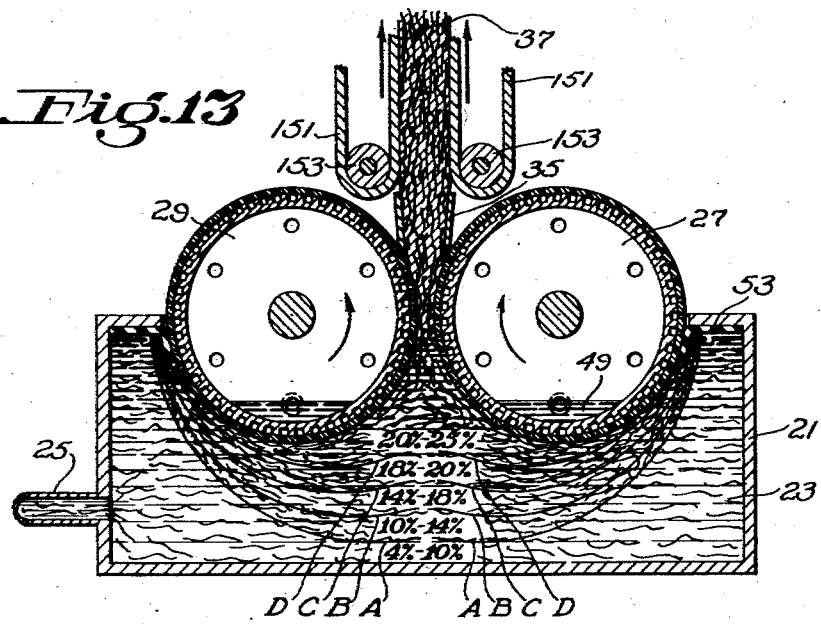
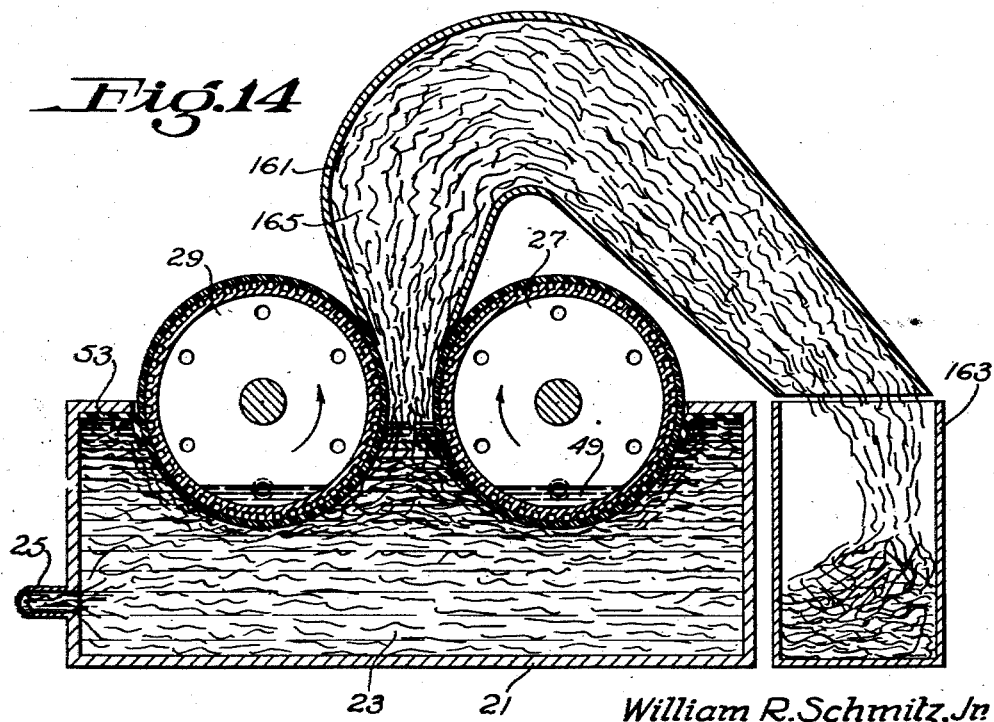

Patented Jan. 12, 1943

2,308,031

UNITED STATES PATENT OFFICE 2,308,031

SEPARATION APPARATUS

William Richard Schmitz, Jr., Buffalo, N. Y., assignor to E. I. du Pont de Nemours & Company, Wilmington, Del., a corporation of Delaware Application June 1, 1940, Serial No. 338,443

1 Claim. (Cl. 100—47)

The present invention relates to a process and apparatus for separating the solid and liquid components of a slurry, and more particularly it relates to a process and apparatus for the continuous mechanical separation of the solid components from the liquid suspension medium of a slurry.

Although the process and apparatus of this invention is of general utility in the separation of the solid and the liquid components of a mixture, it is particularly suitable for the separation of a fibrous material from a slurry comprising a fibrous material and a liquid suspension medium, for example, the separation of alkali cellulose from a caustic soda solution, the separation of wood pulp from the treating solution, or the separation of fibrous masses of cellulose ethers and esters from their liquid media.

An apparatus for separating a solid material from a liquid or pasty slurry containing the same, in order to effect the separation in an entirely satisfactory manner, must comply with the following requirements:

The device should operate in a continuous manner to yield a product of uniform composition. The product must be delivered in a convenient form for handling. The device should be capable of delivering such a uniform product over extended periods of time with little or no operating attention. The device should be flexible in operation so that not only may its rate of production be varied but also that the composition of the product formed by it may be varied over any desired range. The device must lend itself to a good mechanical design. It should possess a minimum of moving parts and seals so that both the initial and the maintenance costs will be low. The device must be of a safe construction presenting a minimum of hazard to the operating labor. This is a point of the utmost importance because in many instances the treating fluid constituting the suspension medium of the slurry is of a caustic or otherwise harmful nature. This is especially true in the above-mentioned case of the preparation of alkali cellulose wherein cellulosic materials are treated with fairly concentrated solutions of caustic alkali. The device should have a low power consumption.

The known devices for the separation of a slurry into its component parts of solid material and suspension medium are all deficient in one or more of the above-mentioned requirements.

It is an object of this invention to provide an improved process and apparatus for separating a slurry into its component parts of solid material and liquid suspension medium.

It is another object of this invention to provide an improved continuously operating process and apparatus for separating a slurry into its component parts of solid material and liquid suspension medium, and to deliver the solid material as a uniform product containing a small predetermined quantity of free liquid.

It is a further object of the present invention to provide a continuously operating process for the separation of a slurry into its solid and liquid components by continuously forcing the slurry under pressure into a receiver therefor, continuously withdrawing the liquid components from the solid component of the slurry in the receiver, and continuously passing the solid component from the receiver while compressing the same to remove the free liquid therefrom.

It is a still further object of this invention to provide siutable apparatus for carrying out the above process.

Other objects of the invention will appear hereinafter.

The details of the present invention will be more clearly apparent by reference to the following description when taken in connection with the accompanying illustration, in which:

Figure 1 is a sectional view through an apparatus constructed in accordance with the present invention.

Figure 2 is a top plan view of the apparatus shown in Figure 1.

Figure 3 is a sectional view taken along the line 3—3 of Figure 1.

Figure 4 is a sectional view taken through a modified form of apparatus constructed in accordance with the invention.

Figure 5 is a top plan view of the apparatus shown in Figure 4.

Figure 6 is a sectional view taken along the line 6—6 of Figure 4.

Figure 7 is a perspective view of a portion of a flanged roll of the apparatus as shown in Figure 4.

Figure 8 is a broken, detailed view showing certain details of the rolls illustrated in Figure 1.

Figures 9, 10, 11, 12, 13 and 14 are sectional views of modified forms of apparatus constructed in accordance with the present invention.

For convenience, the invention will be discussed with specific reference to the separation of a slurry of cellulose in a solution of alkali such as is obtained in the preparation of alkali cellulose. It is to be understood, however, that the invention is not to be limited thereto.

Referring to Figures 1, 2, and 3 of the drawings, reference numeral 21 designates a receiving chamber for the slurry which is forced therein under pressure through conduit 25 by means of a pump, or the like, 26.

A pair of pressing rolls 27 and 29 are positioned in the top wall of the chamber 21. These rolls are mounted on shafts 31 and 33, respectively, and the shafts are journaled in the top wall of the chamber for rotation. One of the journal bearings in the chamber is preferably made adjustable toward or away from the other journal bearing so that the space between the rollers may be regulated. The shafts and the rolls will be driven, in any desired manner, in opposite directions of rotation, as shown by the arrows in Figure 1, so that their surfaces at the bite between them move in upward direction. By this manner of rotation, the solid material of the slurry is passed upwardly from the chamber between the rolls which exert a pressing action on the solid material. The solid material passes from between the rolls in the form of a solid slab 37. A guiding chute 35 may be provided for guiding the slab 37 from the rolls. Each of the rolls 27 and 29 comprise a cylindrical member 39 containing a plurality of longitudinal grooves 41. The outer periphery of the rolls is comprised of a perforated member 43 which contains a large number of small perforations 45 for passage of the liquid medium of the slurry. The perforations 45 must be sufficiently small to prevent any substantial passage of solid material therethrough. The cylindrical member 39 may also be provided with circumferential grooves as shown by numeral 66 in Figure 7 of the drawings. The cylindrical members 39 are provided with openings 67 through the members thereby permitting the liquid which passes through the perforations 45 and along the grooves 41 and 66 to pass into the interior of the cylindrical member. The liquid 49 on the interior of the cylindrical rolls is passed from the rolls through openings 47 and conduits 51. The conduits 51 are positioned in the chamber 21 and are in radial alignment with the openings 47. The rolls 27 and 29 are positioned closely adjacent to the side walls of the chamber 21 so that there will be substantially no leakage of the slurry between the rolls and the chamber. The end surface of the rolls, as well as the side walls of the chamber at those points adjacent the rolls, are provided with a smooth finish and the clearance between the rolls and the side walls is of the order of .015 to .002 inch. This close clearance provides an effective seal between the chamber and the roller surfaces so that leakage of the slurry is substantially prevented. In view of the slight clearance, this seal is not subjected to wear and hence presents no replacement or maintenance problem. The sections of the chamber adjacent the peripheral surfaces of the two rolls is preferably provided with a sealing means such as shown by numeral 53 in Figure 1. The seal 53 is flexible and may be composed of rubber, or the like, and is adapted to yield upon rotation of the rolls and yet is forced against the peripheral surface of the rolls by the pressure of the slurry in the chamber. Conduits 55 are provided adjacent the peripheral surfaces of the rolls and in alignment with the longitudinal grooves 41. These conduits are adapted to pass a liquid under pressure through the grooves 41 which liquid will be forced through the perforations 45 to clean any fibrous matter adhering thereto. This is illustrated more clearly in Figure 6 of the drawings.

In operation of the device illustrated in Figures 1, 2, and 3, the slurry 23 is passed under pressure into the chamber 21. Since the slurry is under pressure, liquid will immediately flow from the slurry mass through the perforations 45 into the grooves 41 and 66 and through the openings 67 to the interior of the rolls 27 and 29. The interior of the rolls 27 and 29 are, of course, open to the atmosphere. The rolls are slowly rotated in the chamber and the solid components of the slurry will have a progressively greater concentration in the slurry mass from the bottom of the chamber 21 towards the rolls 27 and 29. Adjacent the surfaces of the rolls in the chamber there is gradually built up mats of separated solid material which will cling to the roll surfaces and upon rotation of the rolls the solid material is compressed between them to force the remaining free liquid therefrom. The liquid pressed from the rolls either flows back into the chamber 21 or flows through the perforations 45, grooves 41 and 66, and openings 67 to the interior of the rolls. The solid mass passes from between the rolls through the guide member 35 where there will be a slight expansion of the slab 37 of solid material. The slab of solid material which is constantly moving from between the rolls may be passed to any desired receiving means or may be continuously comminuated to a finely divided state. The liquid is passed from the interior of the rolls through conduits 51 and openings 47 in the end surfaces of the rolls. It will be clearly apparent that upon rotation of the rolls the openings 47 will periodically align themselves circumferentially with the conduit 51.

Referring to Figures 4, 5, and 6 of the drawings, the apparatus here shown is similar to that above described with reference to Figures 1, 2, and 3. However, roll 29 is provided, at each end thereof, with a flange 61. The roll 27 rotates within the two end flanges 61 with a very slight amount of clearance. The ends of flanges 61 of roll 29, as shown in Figure 6, are positioned to rotate with a small clearance (.015 to .002 inch) adjacent the shoulder 58 of the chamber 21. The shoulder 58 is made sufficiently wide to permit a clearance of at least ½ inch between the end of the flanged roller and the side wall of the chamber. This space between the ends of the roller and the chamber will function as a well for liquid passing from the interior of the roll outwardly through the openings 47. The liquid will flow from this well 59 through conduit 57 fixed in the side walls of the chamber. The chamber 21, as shown in Figure 4, is provided with a wedge-shaped projection 63 on the bottom wall of the chamber. This wedge-shaped projection functions to improve the formation of the slab of pressed solid material by preventing the possible formation of a column of very dense slurry between the bite of the rolls and the bottom wall of the chamber.

Referring to Figure 7 of the drawings, the openings 65 in the flange 61 of the roll 29 are provided for cleaning the perforated periphery of the roll, and these holes are in alignment with the longitudinal grooves 41 of the roll. The roll illustrated in this figure is shown with a peripheral surface composed of a screen member 44. Obviously, any type of a perforated element can be used as the peripheral surface of the rolls so long as the perforations are sufficiently small to prevent the passage of a substantial amount of a solid material. The term "perforated member" or "perforations" as used throughout the specification or claim is meant to include any type of element containing openings which are of such a size to readily pass the liquid phase of the slurry and to withhold passage therethrough of the solid component of the slurry.

Referring to Figure 8 of the drawings, the opening 67 through the cylindrical element of the roll is more clearly shown. This opening, as pointed out above, is necessary in this modification to permit the passage of liquid from the slurry to the interior of the roll. This figure of the drawings also illustrates an enlargement in the side wall of the chamber at the section where the shaft is journaled in the side walls. Obviously, the side walls may be made of any thickness or strength, or, if desired, metal journal members may be attached to the chamber side walls in any desired manner to increase the length of life of the apparatus. This figure also shows the close clearance between the side wall of chamber 21 and the end wall of the roll.

Referring to Figure 9 of the drawings, the rolls 27 and 29 are provided with a flexible endless perforated web or belt member 101. The member 101 containing a large plurality of perforations 103 is mounted to pass over rolls 105 and 107. In this modification the perforations 103 can be more easily cleaned by passing a jet of water, or other liquid, 115, flowing from conduit 113 against the inside surface of the web to dislodge any solid material which may have accumulated in the perforations 103. The washing liquid flowing from the member 101 may be caught in a container 109 and drained through conduit 111. It will be readily apparent that this device will function similarly to the above-described forms of apparatus and may comprise a form of roll illustrated in Figures 1, 2, and 3.

The modification of apparatus illustrated in Figure 10 is similar to that shown in Figure 9. However, the flexible perforated member 117 containing a large plurality of perforations 118 is made to convey the slab 37 of solid material from the rolls 27 and 29. This is accomplished by placing rolls 123 at a point spaced slightly above rolls 27 and 29. The two rolls 123 are spaced from each other at a sufficient distance to allow for the expansion of the slab 37 as it passes upwardly from the rolls 27 and 29. This form of apparatus is also provided with rolls 119 and 121 and a washing means similar to that in Figure 9 provided between these two rolls.

Referring to Figure 11 of the drawings, a special form of chamber is provided which will permit a greater peripheral contact of the slurry with the rolls 27 and 29. This form of device is particularly useful when separating the liquid from the solid components of a slurry which contains a comparatively large amount of liquid. The chamber 131 is provided with downwardly projecting wall sections 135 from the top wall 133. The flexible sealing means 53 are provided between these downwardly projecting wall sections 135 and the peripheral surfaces of the rolls 27 and 29. This form of device is otherwise similar to that illustrated in Figures 1, 2, and 3 of the drawings.

Figure 12 illustrates a modified form of device which is particularly suitable for the separation of the solid from the liquid component of a slurry which contains a comparatively small amount of liquid. In this form of device only a very small section of the peripheral surfaces of the rolls 27 and 29 are in contact with the chamber 141. In this form of device, additional liquid receiving means 143 are provided adjacent the chamber 141. The liquid receiving means 143 are provided with drainage conduits 145.

A wedge-shaped member 144 is positioned adjacent the rolls 27 and 29 of this modification. Member 144 functions similarly to member 63 in Figure 4. However, instead of being mounted on the bottom of the slurry chamber, member 144 is positioned adjacent to the pressing rolls and is spaced from the bottom of the chamber, thus permitting flow of slurry under the member.

The modified form of apparatus shown in Figure 13 of the drawings comprises belts or other flexible web means 151 and pulleys 153 on opposite sides of the slab 37 of solid material passed from between the rolls 27 and 29. The belts are made to contact the slab 37 and aid in conveying the same to any desired point. The sides of the belt contacting the slab 37 are moved in a direction away from the rolls 27 and 29 as illustrated by the arrows. A guiding chute 35 may also be used in this form of device.

Figure 13 also illustrates diagrammatically how the slurry varies in liquid content between the bottom surface of the chamber 23 and the rolls 27 and 29. The concentration of the slurry will, of course, vary depending upon the pressure of the slurry in the chamber, the rate of rotation of rolls 27 and 29, and the concentration of the slurry before it passes into the chamber 21. The slurry between the walls of the container and line A may, for example, comprise 4% to 10% by weight of the solid in the liquid suspension medium. The slurry between lines A and B may have a solid content between 10% and 14%; the slurry between lines B and C may have a slurry content of between 14% and 18%; the slurry content between lines C and D may have a solid content of between 18% and 20%, and the slurry content between the peripheral surfaces of the rolls 27 and 29 and line D may have a solid content of between 20% and 25%.

In the apparatus shown in Figure 14 of the drawings the press rolls 27 and 29 are spaced farther apart from each other and the solid material passed between these rolls, the speed of the rolls remaining the same, will contain considerably more free liquid. As a result, the solid material will not be pressed to a firm slab as illustrated in the other modifications of apparatus. The density of the slab is determined by the speed of the pressing rolls, the spacing between rolls, and the pressure of the slurry in the slurry chamber. The solid mass passed from rolls 27 and 29 in Figure 14, assuming the pressure in the slurry chamber and the speed of the rolls to be about the same as in the other modifications of the apparatus described, will be fibrous and crumbly in nature and may be passed upwardly to a chute 161 and directly into a container 163 in which the solid material will be present in a substantially divided form. In the event that the solid material 165 passing from the spaced rolls 27 and 29, shown in this modification, is not sufficiently finely divided, means may, if desired, be provided within the chute 161 to agitate the mass and divide the same into fine particles. A crumbly mass of material may also be obtained when the rolls are spaced comparatively close together if the rolls are rotated rapidly so as to yield a product having a large liquid content.

The method of operation of the present invention is illustrated in the following examples which are, however, not to be considered limitative of the invention:

Example I

Wood pulp is dispersed in 18% caustic soda solution having a temperature of 25° C. to form a slurry containing 4.5% cellulose based on the weight of air-dry cellulose. This slurry is pumped into the press rolls set up as shown in Figure 3 at the rate of 5.06 pounds of cellulose per minute, or 112.4 lbs. of slurry per minute. The peripheral surface of the rolls may comprise, either a screen made of 0.023 inch iron wire 20 x 20 mesh, or a perforated metal plate having a thickness of $\frac{1}{32}''$ and containing openings having a diameter of .04'' and spaced from each other on .08'' centers. The rolls are spaced ¾ of an inch apart at the bite and rotate to give a surface speed of 17.6 inches per minute. The pressure of the slurry in the chamber is about 18 pounds per square inch. A continuous slab of pressed alkali cellulose is obtained having a very small quantity of free liquid and analyzing 15.7% NaOH and 29.0% cellulose.

Example II

Wood pulp slurry as above-described and containing 4.2% cellulose, based on the weight of air-dry cellulose, is pumped into the chamber at a rate of 4.4 pounds of cellulose per minute, or 104.7 pounds slurry per minute. The rolls are covered with 16 x 16 mesh screens of 0.024 inch iron wire. The rolls are spaced 2.0 inches apart at the bite and are rotated to give a surface speed of 4.35 inches per minute. The pressure of the slurry in the chamber is 20 to 25 pounds per square inch. A crumbly mass of pressed alkali cellulose is obtained having a small quantity of free liquid and analyzing 15.28% sodium hydroxide and 43.34% cellulose.

Example III

Wood pulp slurry as above-described and having a cellulose content of 5.2%, based on the weight of air-dry cellulose, is pumped into the chamber set up and operating as in Example I, at the rate of 5.3 pounds of cellulose per minute, or 102 pounds slurry per minute. The pressure of the slurry in the chamber will be about 29 lbs. per square inch. A continuous slab of alkali cellulose is obtained having very little free liquid and analyzing 15.6% sodium hydroxide and 33.5% cellulose.

The press rolls are preferably of the same diameter but this is not essential to the operation of the apparatus. It is necessary, however, that the peripheral speed of the two rolls be the same.

The pressure to which the mats are subjected at the bite between the rolls is dependent upon a number of factors such as the width of the bite between the rolls and the speed of rotation of the rolls. Under normal operating conditions for the separation of alkali cellulose from a slurry containing the same as set forth in the examples, the pressure to which the mats are subjected is extremely high probably of the order of 2,000 pounds per square inch, or even higher. Naturally, this pressure is exerted in all directions not only against the filter surfaces of the rolls but also against the end flanges 61 of the roll 29 in Figures 4, 5, and 6. Were it not for the presence of these flanges, this pressure would force the upwardly moving mass of solid material against the walls of the tank adjacent the bite. This upward movement of the solid material past the stationary walls of the tank would create a tremendous friction drag and an excessive amount of power would be required to effect the rotation of the rollers. The flanges, however, move upward along with the solid material and thus largely eliminate this friction drag.

Naturally, the exact operating conditions to be used for the separation of any given slurry will depend upon the desired physical state of the finished product and the quantity of free liquid which can be tolerated in the product. Thus, the rollers must exert a very intense pressing action if a solid of low free liquid content is desired. While the exact operating conditions are dependent upon the exact composition of the slurry to be separated, the following general conditions will prove satisfactory for the separation of most slurries and will yield a slab of alkali cellulose of a desirable physical characteristic.

The pressure differential between the interior of the tank and the interior of the rollers should be of the order of 15 to 20 pounds per square inch, the slurry being pumped into the tank at a sufficiently high rate to maintain this pressure within the tank while the interior of the rollers is maintained at atmospheric pressure. The pressure differential may, however, be much larger than above specified, for example, this differential may be 100 or more lbs. per inch.

The invention is not limited to the use of a positive pressure within the chamber. Satisfactory results can be obtained by maintaining a vacuum within the press rolls while the interior of the chamber is maintained at any pressure less than, equal to or greater than atmospheric pressure, provided only that the pressure in the chamber is greater than the pressure in the rolls.

The bite between the rolls should be about ¾ inch in width. This, of course, depends upon the pressure in the chamber, the concentration of the slurry, the peripheral speed of the rolls, etc.

The peripheral speed of the rolls should be of the order of 6 to 20 inches per minute. The speed of the rolls and the width of the bite between rolls can be varied widely and yet obtain satisfactory operating conditions. Nevertheless, the operating conditions must be controlled with care if the pressed material is to be obtained in the form of a continuous slab.

The rolls may be fitted with other filtering surfaces than the perforated members mentioned above and any filtering medium that will withstand the action of the suspension medium may be satisfactorily used. Thus, a fine mesh wire screen, such as a web formed from a single layer of 20 x 20 mesh .023 inch wire may be used as the filtering medium. Such a web of wire mesh may satisfactorily encircle the rolls completely, being fastened thereto by spot welded joints or the screen may be passed in a continuous manner about the rolls and about other supporting rolls as shown in Figures 9 and 10 of the drawings.

This invention provides a continuously operating device for separating a slurry into its component parts of solid material and suspension medium and for delivering the solid material as a uniform product containing only small, predetermined amounts of the suspension medium and in a convenient form for handling.

The invention provides a means of removing the liquid suspension medium from the solid material of a slurry whereby the suspension medium removed is directed away from the solid material, so that any further wetting of this material is prevented. Thus, the device yields a solid product of uniform composition that is free from any streaks or spots of high free fluid content.

The invention depends primarily upon the successful operation of first, a pair of rolls serving both as filter rolls and as pressure rolls, and secondly, of seals between the roll surfaces and the tank which seals prevent leakage of the slurry from the device and enable the proper pressure differential to be maintained within the apparatus. This pressure differential not only serves to effect the preliminary separation of the solid alkali cellulose from the bulk of the suspension medium but also causes the mass of alkali cellulose thus formed to cling to the surfaces of the rolls and be delivered into the bite of the rolls.

The extent of this pressure differential and the rate of rotation of the rolls act together to determine the amount of solid material that is brought into the bite of the rolls and formed into a slab. Hence, for a slurry of given composition, these two factors, together with the thickness of the bite, determine the proportion of solid material and suspension medium present in the slab of pressed material produced by the device.

The device is economical from the standpoint of construction, maintenance, and operation. It has few moving parts and these are subjected to a minimum of wear. It acts to effect the separation of the slurry by providing an area wherein large amounts of the slurry are concentrated under comparatively low pressures while the final portions of the suspension medium are forced from the separated solid material by a mechanical pressing action wherein small amounts of the separated solids are continuously subjected to extremely high pressures exerted over a short period of time. In this manner, the slurry is effectively, rapidly, and economically, separated into its component parts. The device lends itself to an easy adjustment of operating conditions so that it may be used to satisfactorily separate a slurry of almost any nature, it further being possible to so adjust the action of the device as to obtain almost any degree of separation desired in a slurry. The device will operate unattended over long periods of time to produce a completely uniform product. Further, it is sufficiently flexible in operation so that both its rate of out-put and the nature of its product can be varied to meet with the requirements of operation.

The device is capable of producing a solid product having a low percentage of free liquid more economically than any other type of separating device now known or on the market.

The device is of good mechanical design. It presents a minimum of moving parts and seals so that it is not expensive from the viewpoint of either construction or maintenance. The unit is independent of outside sources of power. It is compact and occupies but little floor space in comparison with other devices of similar capacity.

The device operates to effect the separation of relatively large amounts of slurry with a very low consumption of power. This is undoubtedly due in part to the fact that the pressure within the chamber acts in an upward direction against the slab formed in the bite of the rolls and thus aids the rotating rolls in forcing the slab from the bite. This action of the pressure is in addition to its action in forcing the mats of solid material to cling to the submerged surfaces of the rolls and thus be led into the bite and subjected to the very high pressure existing at that point.

The presence of the extending flanges on one of the rolls prevents the generation of any sliding friction between the upwardly moving mat and the stationary walls of the tank. This is a further factor that acts to insure the use of but small amounts of power in the separation of a slurry into its component parts.

The preferred embodiment of the invention contains within it many features that are novel from the viewpoint of both construction and operation. For example, the drainage of the separated suspension medium through holes located in the ends of the rolls and coacting with a single hole located in the wall of the chamber provides a satisfactory method of removing the liquid separated from the slurry. This construction avoids the necessity for axial drainage of the rolls, including the use of a hollow shaft, the adoption of which is expensive, because of larger bearings, etc., which is not only expensive to construct but difficult to effectively seal against leakage. By effecting the removal of the liquid from below the center of the rolls, any after-wetting of the already pressed solid material by the expressed liquid is also prevented. This construction further permits the rolls to be fitted with reinforcing members in a less complicated manner than if they had been equipped with an axial drainage system.

The effecting of satisfactory seals by the use of close clearances between the rolls and the chamber provides an unobvious but economical and entirely satisfactory method of sealing the apparatus against leakage.

I claim:

In an apparatus for separating the solid from the liquid components of a slurry, a slurry receiving chamber, means for forcing said slurry under pressure into said chamber, a pair of parallel, cylindrical pressing rolls, end walls in said rolls, said rolls being rotatably mounted in one wall of said chamber, longitudinal and circumferential grooves in said rolls, perforate members overlying said grooves, said perforate members permitting the passage of the liquid, but not the solid, components of the slurry, openings through the cylindrical walls of said rolls, and means for removing from the interior of said rolls the liquid passing through the perforate members and openings, the end walls of said rolls having openings therein in alignment with said grooves, fixed conduit means positioned in radial alignment with said openings whereby liquid passed through said conduit means will pass through said openings, into said grooves and through said perforate members, and means for rotating said rolls to compress the solid components of the slurry and remove the solid components from the chamber.

WILLIAM R. SCHMITZ, Jr.